United States Patent
Linnell et al.

(10) Patent No.: US 9,037,795 B1
(45) Date of Patent: *May 19, 2015

(54) MANAGING DATA STORAGE BY PROVISIONING CACHE AS A VIRTUAL DEVICE

(71) Applicant: EMC Corporation, Hopkinton, MA (US)

(72) Inventors: Thomas E. Linnell, Northborough, MA (US); Walter A. O'Brien, III, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,195

(22) Filed: Nov. 20, 2013

Related U.S. Application Data (63) Continuation of application No. 13/225,912, filed on Sep. 6, 2011, now Pat. No. 8,694,724.

(51) Int. Cl.
*G06F 11/20* (2006.01)
*G06F 12/08* (2006.01)
*G06F 11/10* (2006.01)

(52) U.S. Cl.
CPC ........ *G06F 12/0866* (2013.01); *G06F 11/1088* (2013.01); *G06F 11/2082* (2013.01)

(58) Field of Classification Search
CPC . G06F 12/0866; G06F 11/1666; G06F 11/20; G06F 12/0868; G06F 11/16; G06F 11/1076; G06F 11/2094; G06F 3/0689; G06F 2211/1059; G06F 2211/103; G06F 12/08568; G06F 2211/1088; G06F 3/0608; G06F 3/0631; G06F 11/1088; G06F 12/00; G06F 2211/1009; G06F 11/1092; G06F 11/2082; G06F 11/1096; G06F 11/2097; G06F 11/2089; G06F 11/0727; G06F 12/084; G06F 2201/855; G06F 3/0611; G06F 3/068; G06F 11/004
USPC .................................................. 711/114, 113
See application file for complete search history.

(56) References Cited

U.S. PATENT DOCUMENTS

| | | | |
|---|---|---|---|
| 7,437,386 B2 * | 10/2008 | Callahan et al. ....................... 1/1 |
| 8,086,893 B1 * | 12/2011 | Macfarland et al. .............. 714/3 |
| 2005/0114350 A1 * | 5/2005 | Rose et al. ....................... 707/10 |
| 2011/0016257 A1 * | 1/2011 | Aruga ........................... 710/316 |
| 2012/0173790 A1 * | 7/2012 | Hetzler et al. ................. 711/103 |

* cited by examiner

*Primary Examiner* — Hashem Farrokh
(74) *Attorney, Agent, or Firm* — Krishnendu Gupta; Jason A. Reyes (57) ABSTRACT

There is disclosed herein techniques for use in managing data storage in a data storage system comprising a cache and data storage devices. In one embodiment, the technique comprises setting a hot spare capacity value for a virtual hot spare device in a data storage system. The technique also comprises detecting the state of data storage devices in a RAID configuration in the data storage system. The technique further comprises determining if a cache in the data storage system has free capacity corresponding to the hot spare capacity value in response to detecting a failure state in connection with at least one of the data storage devices in the RAID configuration. The technique still further comprises provisioning at least a portion of the cache as the virtual hot spare device with a capacity corresponding to the hot spare capacity value in response to determining the cache has free capacity corresponding to the hot spare capacity value.

12 Claims, 9 Drawing Sheets

MANAGING DATA STORAGE BY PROVISIONING CACHE AS A VIRTUAL DEVICE

RELATED APPLICATION

This application is a continuation of co-pending U.S. patent application Ser. No. 13/225,912, entitled MANAGING DATA STORAGE BY PROVISIONING CACHE AS A VIRTUAL DEVICE filed Sep. 6, 2011 which is hereby incorporated herein by reference for all purposes.

BACKGROUND

1. Technical Field

The present invention relates to managing data storage.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and destage the cached data at different times onto the physical disk drives. The data storage system may utilize a backup or secondary power supply for use in connection with preventing loss of cached data in the event of a power failure. In the event of a power failure, the data storage system may utilize the backup power supply to provide power to the storage processor and physical data storage devices of the data storage system for a short period of time. During this period of time, the storage processor stores the data from its cache to a dedicated area on the storage devices that may be referred to as a "vault" so that the vault includes the cached data which has not yet been destaged onto the physical storage devices.

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

In a particular example, as is known in the art, large host computer systems require large capacity data storage systems. These large computer systems generally include data processors which perform many operations on data introduced to the computer system through peripherals including the data storage system. The results of these operations are output to peripherals, including the storage system.

In accordance with the example, one type of data storage system is a magnetic disk storage system. Here a bank of disk drives and the computer system are coupled together through an interface. The interface includes "front end" directors (or controllers) and "back end" disk directors (or controllers, also known as rear end directors or disk directors). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the front-end directors and disk directors, an addressable global cache memory. The global cache memory is a semiconductor memory connected to all of the front end directors and back end directors and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

In operation, when the host computer wishes to store end-user (i.e., host computer) data at an address, the host computer issues a write request to one of the front-end directors to perform a write command. One of the front-end directors replies to the request and asks the host computer for the data. After the request has passed to the requesting one of the front-end directors, the director determines the size of the end-user data and reserves space in the cache memory to store the request. The front-end director then produces control signals for such front-end director. The host computer then transfers the data to the front-end director. The front-end director then advises the host computer that the transfer is complete. The front-end director looks up in a Table, not shown, stored in the cache memory to determine which one of the rear-end directors is to handle this request. The Table maps the host computer address into an address in the bank of disk drives. The front-end director then puts a notification in a "mail box" (not shown and stored in the cache memory) for the rear-end director which is to handle the request, the amount of the data and the disk address for the data. Other rear-end directors poll the cache memory when they are idle to check their "mail boxes". If the polled "mail box" indicates a transfer is to be made, the rear-end director processes the request, addresses the disk drive in the bank, reads the data from the cache memory and writes it into the addresses of a disk drive in the bank. When end-user data previously stored in the bank of disk drives is to be read from the disk drive and returned to the host computer, the interface system operates in a reciprocal manner. The internal operation of the interface (e.g. "mail-box polling", event flags, data structures, device tables, queues, etc.) is controlled by interface state data (sometimes referred to as metadata) which passes between the directors through the cache memory. Further, end-user data is transferred through the interface as a series of multi-word transfers, or bursts. Each word transfer in a multi-word transfer is here, for example, 64 bits. Here, an end-user data transfer is made up of, for example, 32 bursts. Each interface state data word is a single word having, for example, 64 bits.

In another example, a data storage system has a pair of storage processors connected to an array of disk drives. For example, such a system is disclosed in U.S. Pat. No. 5,922,077, which is hereby incorporated by reference herein, and which describes a dual data storage controller system in which the controllers are connected to one another by a peer-to-peer communication link. Each data storage controller is connected to a fibre channel loop in connection with each of the disk drives in the disk array. Fail-over switches provide each data storage controller with a means for connecting to either one of the fibre channel loops.

Each storage processor has its own write cache memory and the two storage processors may be configured to communicate with each other through a Cache Mirroring Interface (CMI) bus in the peer-to-peer communication link in order to maintain cache coherency as well as to minimize the impact of cache mirroring disk writes. In particular, the CMI bus enables a copy of data to be available on both storage processing units before the disk write operation is complete. In this system, a first storage processing unit has a first CMI interface circuit, a second storage processing unit has a second CMI interface circuit, and the first and second CMI interface circuits connect to each other through the CMI bus.

As is also known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer (e.g., here, a back end director) along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

The host computer, which for some purposes may include the storage system itself, may not address the disk drives of the storage system directly, but rather access to data may be provided to one or more host computers from what the host computers view as a plurality of logical devices or logical volumes (LVs), also referred to as LUNs. The LUNs may or may not correspond to the actual disk drives. For example, one or more LUNs may reside on a single physical disk drive. In another example, a LUN may use storage space from multiple physical disk drives. An LV or LUN (logical unit number) may be used to refer to the foregoing logically defined devices or volumes.

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a LUN is configured so that its data is written across multiple disk drives in the striping technique, the LUN is operating in RAID-0 mode. Alternatively, if the LUN's parity information is stored on one disk drive and its data is striped across multiple other disk drives, the LUN is operating in RAID-3 mode. If both data and parity information are striped across multiple disk drives, the LUN is operating in RAID-5 mode.

It is also common practice for a data storage system to include a hot spare disk drive. When a regular disk drive fails, the hot spare disk drive kicks in by taking over the role of the failing disk drive. For example, the storage control circuitry stores a copy of the data that currently exists on the failing disk drive onto the hot spare disk drive. The storage control circuitry then operates the hot spare disk drive in place of the failing disk drive. Typically, the failing disk drive is then removed from the data storage system, discarded by a technician, and may subsequently be replaced by another disk drive.

SUMMARY OF THE INVENTION

In one embodiment, a method and system for use in managing data storage is disclosed. Data storage in a data storage system is managed. The data storage system comprising a cache and data storage devices arranged in a RAID configuration. The state of the respective data storage devices is detected. At least a portion of the cache is provisioned as a virtual hot spare device in response to detecting a failure state in connection with one of the data storage devices.

In another embodiment, a method and system for use in managing data storage is disclosed. Data storage is managed in a data storage system. The data storage system comprises a cache and a plurality of data storage devices. Data is stored on the data storage devices. Storage is requested for data at least associated with data stored on at least one of the data storage devices. The request for storage is received for data at least associated with data stored on at least one of the data storage devices. At least a portion of the cache is provisioned as a virtual device in response to receiving the request for storage for data at least associated with data stored on at least one of the data storage devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

The invention can be implemented in numerous ways, including as a process, an apparatus, a system, a composition of matter, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is described below techniques for use in managing data storage. A Flash-based Cached Universal Hot Spare ("CHS") is a virtual device that may be created on-demand from unused/infrequently used cache slots in a large flash-based cache. It can allow the rebuild process to become decoupled from user-based access due to the high-performance random-access nature of flash-based SSD devices, and by virtue of its location in the storage stack, it can provide a location-independent sparing function. When not active, the cache slots may become available to improve overall system performance. Disk failures are infrequent but due to the increased number of devices installed in arrays they are becoming more common, and best practice recommendations typically include the use of hot spares for maximizing system availability. Embedding this functionality into higher-performance storage and providing enhanced system capabilities for both in-use and standby operation can provide a higher overall customer benefit than hard-disk based hot sparing alone. Hard-disk sparing may be combined with this approach to provide both improved performance and complete automation of the rebuild/repair cycle.

Conventionally, the practice is to provide additional hard disks in a standby mode. However, these disks do not provide any benefit until a primary disk fails, then they are used to automate the repair process. While the repair process is in process, the entire RAID group will be processing both rebuild and user IO. The performance and availability of RAID is dependent on the physical location of the disks. When a hot spare is used, it should come from a similar location as the failed drive in order to maintain these characteristics, but this can lead to needing to add spare disks in multiple places in the system, since the order of failure is not known in advance. Due to the capacity available in modern hard disk drives ("HDD's"), it is not practical or feasible to provide sparing capability in, for example, DRAM. For example, a HDD can contain two terabytes of capacity which is 83 times larger than the current DRAM capacity for the largest EMC Corporation VNX platform. System performance during degraded modes can be a concern for customers who may have critical business processes that depend on the performance of a RAID group for completing in a tight time window. Even though disk-based sparing can provide the best availability, it does not improve degraded mode performance other than to reduce the time in degraded mode to the minimum possible.

The advantages of the new techniques include improved performance of RAID during degraded mode and improved system performance by increased use of caching when not in degraded mode. Additionally, the position-independent sparing function of the technique assists in improving performance.

Figure 1:
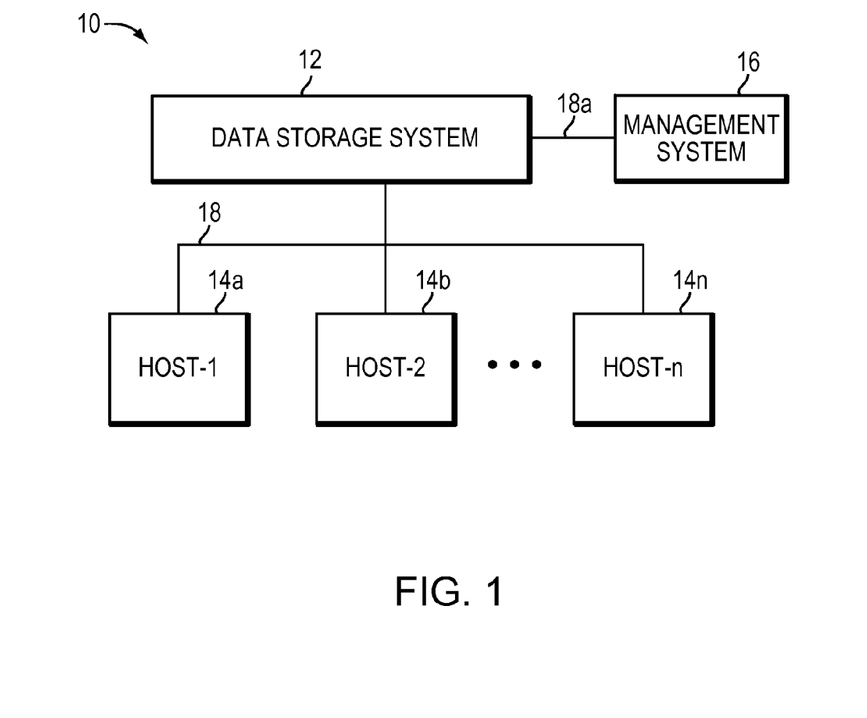
FIG. 1 is an example of an embodiment of a system that may utilize the techniques described herein.

Referring to FIG. 1, there is shown an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 18a. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 18a may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 18a may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 18a by any one of variety of connections in accordance with the type of communication medium 18a. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 18a, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
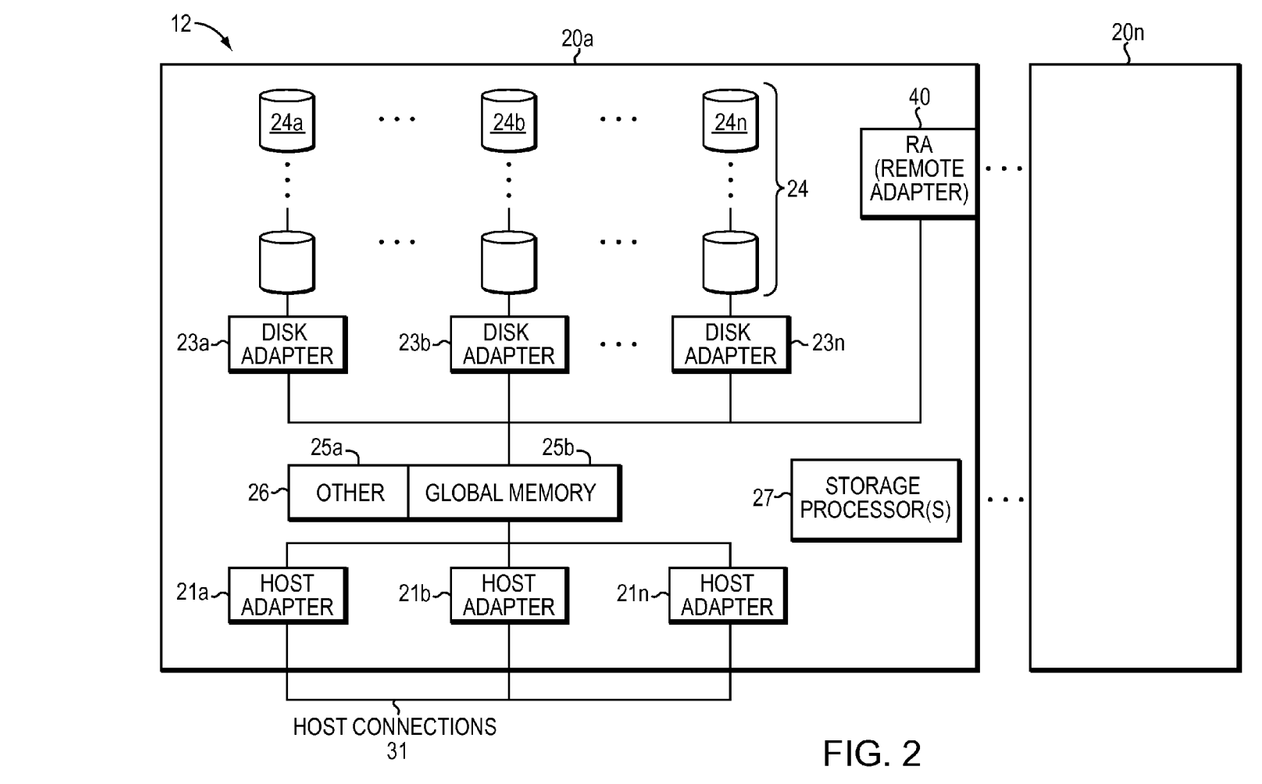
FIG. 2 is a diagram illustrating in more detail components of FIG. 1 that may utilize the techniques described herein.

Referring to FIG. 2, there is illustrated an example of components of data storage system 12 that may be included in the system 10 of FIG. 1. The data storage system 12 of FIG. 2 includes one or more data storage systems 20a-20n as may be manufactured by one or more different vendors as noted above. Each of the data storage systems 20a-20n may be a data storage array inter-connected (not shown) to other data storage array(s). Additionally, as noted above, the data storage systems may also be connected to the host systems through any one or more communication connections 31. In this example, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may perform operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), remote adapters (RAs) and the like. A remote adapter 40 (RAs) may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
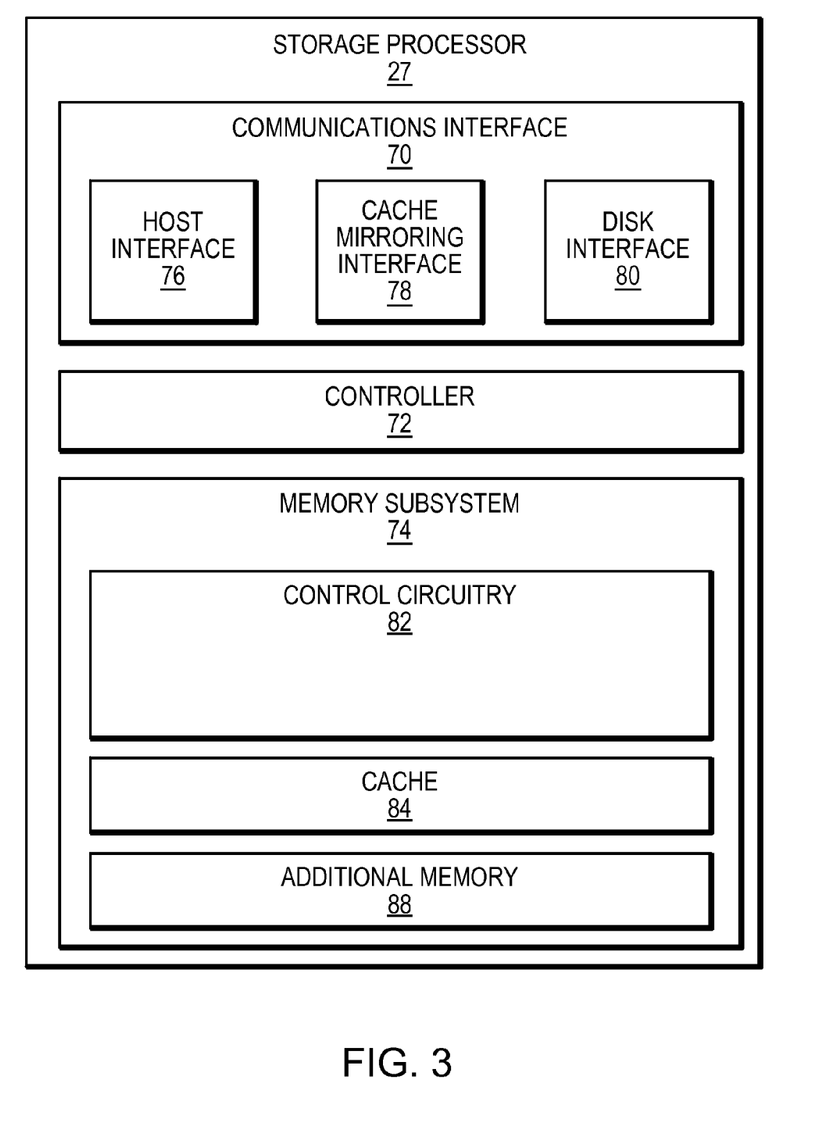
FIG. 3 is a diagram illustrating in more detail components of FIG. 1 that may utilize the techniques described herein.

Referring to FIG. 3, there is illustrated a block diagram example of storage processor 27 as illustrated above. The storage processor 27 may include a communications interface 70, a controller 72 and a memory subsystem 74. The communications interface 70 may include a host interface 76, a cache mirroring interface 78, and a disk interface 80. The memory subsystem 74 may include a control circuit 82, a cache 84 and additional memory 88.

The communications interface 70 may be configured to provide connectivity from the storage processor 27 to various other components. In particular, the host interface 76 may be configured to connect the storage processor 27 to one or more external hosts through connection media. The cache mirroring interface 78 may be configured to connect the storage processor 27 to another storage processor to enable cache mirroring through a cache mirroring bus. The disk interface 80 may be configured to connect the storage processor 27 to the disk drives 24.

The controller 72 may be configured to carryout data storage operations on behalf of one or more external hosts through the communications interface 70. In some arrangements, the controller 72 may be implemented as a set of processors running an operating system which is capable of being stored in a designated area on one or more of the disk drives 24. In other arrangements, the controller 72 may be implemented as logic circuitry (e.g., Application Specific Integrated Circuitry, Field Programmable Gate Arrays, etc.), microprocessors or processor chip sets, analog circuitry, various combinations thereof, and so on.

The memory subsystem 74 may be configured to provide memory services to the controller 72. In particular, the control circuitry 82 of the memory subsystem 74 may be configured to provide logic for use with the cache 84 so as to manage data storage in accordance with the techniques as described hereafter. The control circuit 82 may be further capable of performing other tasks using the additional memory 88.

Figure 4:
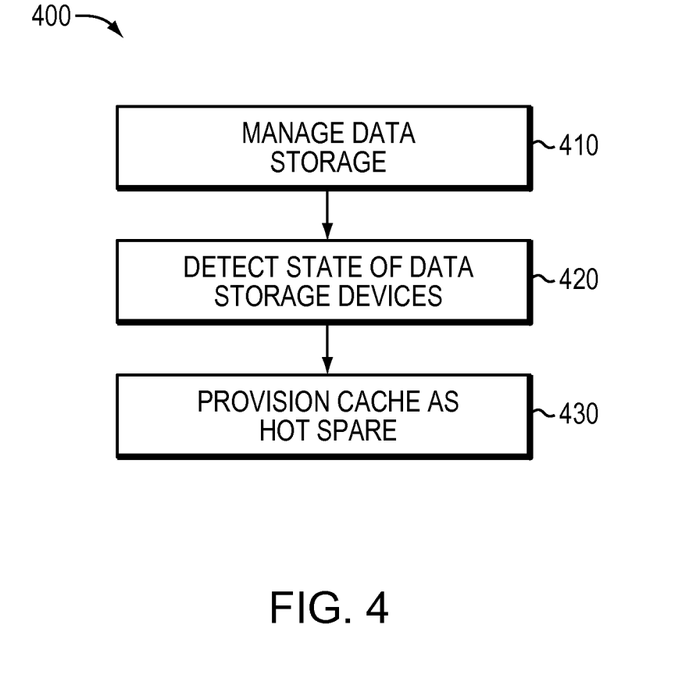
FIG. 4 is a flowchart summarizing the steps for managing data storage.

Referring to FIG. 4, there is illustrated a flowchart summarizing the steps of a technique 400 for managing data storage. It will be appreciated that the aforementioned system and examples may be configured for performing the technique 400 summarized in the flowchart and described herein. As will be appreciated by those skilled in the art, the technique may be performed by a computer program tool executable on a data storage system, for example, the data storage system 12 of FIG. 1. The technique comprises managing 410 data storage in a data storage system. The data storage system comprising a cache and a plurality of data storage devices arranged in a RAID configuration. For example, the cache may be a flash based cache and the data storage devices may be disk drives arranged in a RAID 5 configuration. The technique also comprises detecting 420 the respective states of the data storage devices. In this embodiment, the states are operational states of the data storage devices. For example, the state may be a failure state or a successful operational state. The technique also comprises provisioning 430 at least a portion of the cache as a virtual hot spare device in response to detecting a failure state in connection with one of the data storage devices. In this embodiment, the technique is configured such that a portion at least of the cache may be dynamically provisioned to act as the hot spare in response to detecting a failure state in connection with one of the data storage devices. A problem associated with conventional approaches is that physical hot spares introduce issues of location in the data storage system. The provisioning of the cache as the virtual hot spare device in response to detecting a failure state has the advantage of providing topology-independent hot spare capability.

In one embodiment, as will be described in more detail below, the data associated with the failed device may be rebuilt in the virtual hot spare device in the cache. Additionally, the failed device may be repaired, corrected or replaced. The rebuilt data may be copied and returned to the new data storage device in response to repairing, correcting or replacing the failed data storage device with the new data storage device. In such a scenario, the virtual hot spare device may be re-provisioned as cache in response to copying or returning rebuilt data to the new data storage device.

In another embodiment, there is provided at least one physical hot spare device for use in conjunction with the technique as described herein in order to provide additional assurances. The technique may be configured to use either the physical hot spare device or to provision at least a portion of the cache as virtual hot spare device. The decision may be dependent on the location of the physical hot spare with respect to the data storage devices in the RAID configuration.

Figure 5:
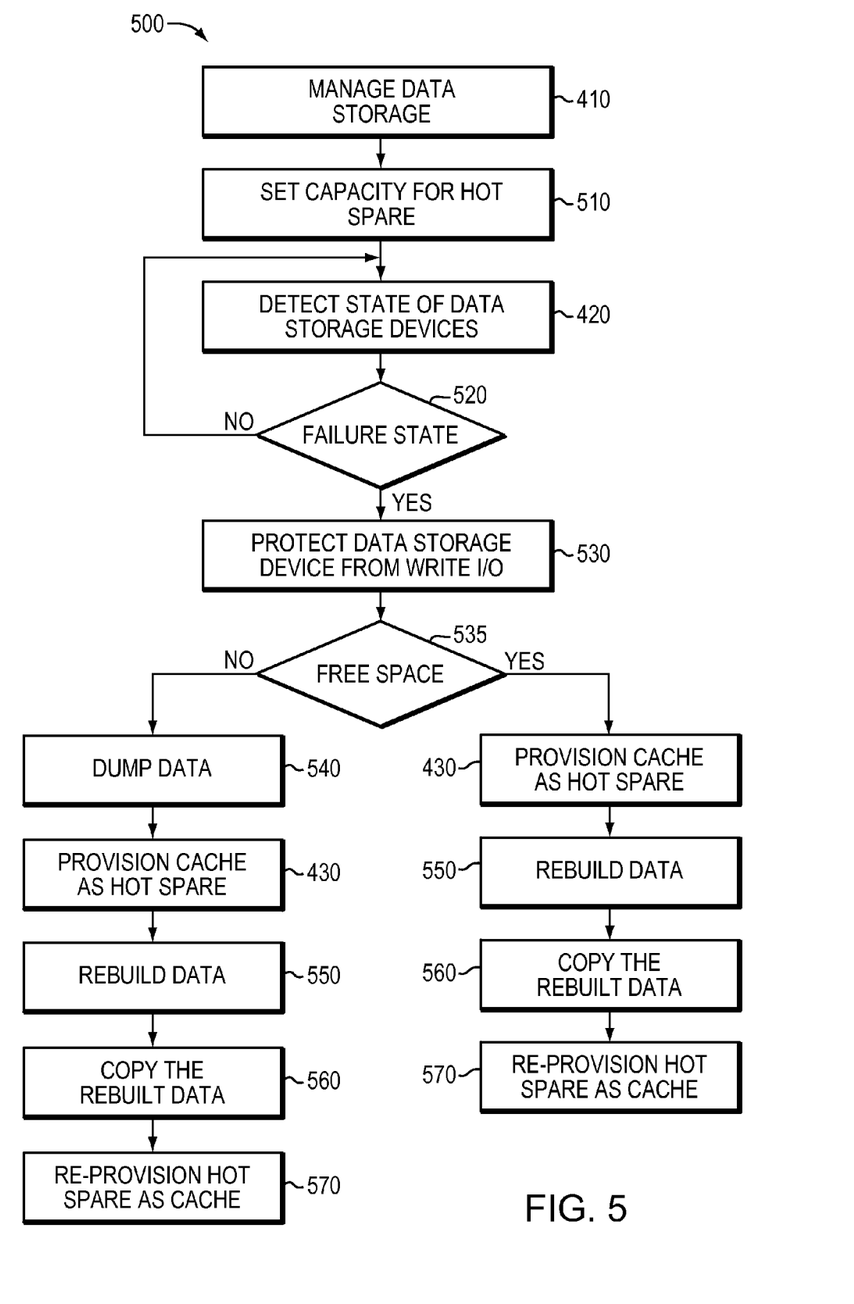
FIG. 5 is a flowchart summarizing the steps of a further embodiment for managing data storage.

Referring to FIG. 5, there is shown a flowchart illustrating a further embodiment of a technique 500 for managing data storage. The embodiment 500 as described herein is similar to the technique as described in FIG. 4 and similar numerals and comments apply to similar features and steps. It will be appreciated that the aforementioned system and examples may be configured for performing the technique 500 summarized in the flowchart and described herein. The technique may also be performed by a computer program tool executable on a data storage system, for example, the data storage system 12 of FIG. 1. The technique comprises managing 410 data storage in a data storage system. As described above, the data storage system can comprise a cache and a plurality of data storage devices arranged in a RAID configuration. In this embodiment, the technique also comprises setting 510 a hot spare capacity value for the virtual hot spare device such that the cache is provisioned as the virtual hot spare device with a capacity corresponding to the hot spare capacity value when a failure state is detected in connection with one of the data storage devices. In this embodiment, the hot spare capacity value may be set by a user of the data storage system. For example, the user of the data storage system may have a spare capacity requirement of 100 GB corresponding to one of the data storage devices in the system. The user may set the hot spare capacity value to 100 GB so that the cache is provisioned as virtual hot spare device with a capacity of 100 GB in response to detecting a failure state in connection with one of the data storage devices. Alternatively, the hot spare capacity value may be a default value. As will also be appreciated by those skilled in the art, the steps 410 and 510 may be interchangeable such that the hot spare capacity value is set before the management of the data storage system is carried out.

The technique also comprises detecting 420 the state of the data storage devices in the data storage system. For example, the states may be operational states such as failure and successful operational states in connection with the data storage devices. In this embodiment, the technique is configured such that if a failure state is detected 520 the failed data storage device is protected 530 from write I/O in response to detecting a failure state in connection with the data storage device. For example, the technique may be configured to protect the failed data storage device from the write I/O and to direct new write I/O to the cache until such time as the failure is corrected or repaired. Moreover, as will be appreciated by those skilled in the art, the technique may be configured to test for read I/O in connection with the failed data storage device. It is well known that many failures relate to write functionality. It is often the case that reads are often more successful. Accordingly, if the data can be read directly from failed data storage device this may be useful in that the data can be rebuilt in the virtual hot spare device from the data in the failed device. Alternatively, as will also be well know in the art, it may be necessary to rebuild the data by obtaining the data from the other surviving data storage devices in the RAID configuration. This will be described in further detail below. The technique as described with respect to this embodiment is also configured such that if a failure state is not detected in connection with one of the data storage devices the technique takes no action except to continue to detect the states of the data storage devices.

In this embodiment, the technique is further configured to determine whether the cache has free space 535 corresponding to the hot spare capacity value in response to detecting the failure state in connection with one of the data storage devices. The hot spare capacity value can be set 510 as described above. The determination 535 is necessary in order to ascertain if the cache can be provisioned as the virtual hot spare device with capacity corresponding to hot spare capacity value. For example, the cache may have data stored therein in which case necessary action will need to be taken. In such a scenario the technique can be configured to dump 540 data such that the cache may have the necessary space or capacity to be provisioned as the virtual hot spare device. If the technique dumps 540 the data to create the free capacity corresponding to at least the hot spare capacity value, the cache can subsequently be provisioned 430 to act as the virtual hot spare device. In this embodiment the data associated with the failed data storage device can subsequently be rebuilt 550 in the portion of the cache provisioned as the virtual hot spare device. The rebuilding process has been described above and similar comments apply here.

In one embodiment, the technique as described above may also be configured to check if the data in the cache has been synchronized with the data in the data storage devices. If it has not been synchronized the technique may be configured to ensure synchronization before dumping data. As will also be appreciated by those skilled in the art, the technique may also be configured to ensure that the data in the cache is synchronized with the data in the data storage devices periodically such that there is no need for a further synchronization operation when a failure state is detected in connection with one of the data storage devices.

In another embodiment, a storage administrator may form a storage configuration policy for the cache. For example, the cache may be divided into three segments, namely, a free segment, a clean segment and a write-back segment. The free segment of the cache may consist of storage space reserved for immediate use by the virtual device. There may be no data stored therein. The clean segment of the cache may consist of storage space for storing synchronized clean data. In other words, the data stored therein is synchronized with the data stored in the data storage devices. The write back segment of the cache may consist of storage space for storing data not synchronized with the data stored in the data storage devices. In a further embodiment the policy may determine the percentage of the cache to be made up by each of the three segments. It will be appreciated by those skilled in the art that the aggregate of the three segments will be the total storage capacity of the cache. For example, for non-critical storage, the policy may state that the cache has no free storage space, ten percent of clean storage space and ninety percent of write back storage space. In another embodiment, for critical storage, the configuration policy may state that the cache has five percent free storage space, forty five percent of clean storage space and fifty percent of write back storage space. It will be appreciated that a storage administrator may choose different percentage values for each segment depending on circumstances. It will also be appreciated that in the technique as described herein the hot spare capacity value may be greater or less than the percentage allocated to the free segment of the cache. In the event that the free capacity value is greater than the percent allocated to the free segment then it will be necessary to dump data from the cache. In such a scenario, the technique may be configured to dump the synchronized data before the write back non-synchronized data in the cache. It will also be appreciated that if it was necessary to dump the non-synchronized data that it would be first necessary to ensure synchronization before dumping. In the event that the free capacity value is less that the percent allocated to the free segment then it will not be necessary to dump any data from the cache as the free segment of the cache would be sufficient to be provisioned as the virtual hot spare device.

In a further embodiment, and as will be appreciated by those skilled in the art, the rebuilt data in the portion of the cache provisioned as the virtual hot spare device may be copied 560 to a new data storage device in response to the failed data storage device being repaired, corrected or replaced with the new data storage device. Moreover, if the data is returned to the new data storage device, the portion of the cache provisioned as the virtual hot spare device may also now be re-provisioned 570 as cache. In this way the capacity of the cache is always in use unless there is a free capacity requirement associated with the cache as discussed above. The requirement for use of a hot spare can be an infrequent activity so the technique can provide the benefit of caching performance when hot spare not required.

Moreover, as described above, in one embodiment the cache may be a flash based cache. An advantage of the flash based cache is that it has lower $/GB and higher capacity of fast cache than, for example, DRAM and can be used for temporary storage of contents of an entire data storage device such as disk drive. Moreover, flash can provide large capacity at much lower cost than DRAM technologies and can be configured to provide additional functionality due to its non-volatile nature. As will be known in the art, caches are typically built out of DRAM memory, which is volatile and requires a lot of standby power. It is also conventionally designed as a function within a controller design, and therefore must be duplicated in high-availability architectures to be able to seamlessly handle controller failures with no loss of data. During a power loss, conventionally the DRAM data must be copied into some other non-volatile memory in order not to lose it, requiring batteries or some other form of short-term energy storage to affect the transition. Flash memory is slower than DRAM but much faster than magnetic hard disk, making flash memory a good candidate for caching data. Flash memory is also nonvolatile, which can avoid some complications. The lower cost of flash memory as compared to DRAM can also mean that more cache can be provided at reasonable cost, making the cache more effective and at least partially mitigating the lower speed. Flash memory may also be combined with DRAM technology to provide the benefits of high-write duty cycle endurance for high-frequency write applications, while maintaining lower cost and high access rates for other applications.

In one embodiment, the technique may be configured to deal with certain use cases in response to detecting a failure state in connection with one of the data storage devices, as follows:

For a degraded write, the technique may write to the virtual hot spare device and may compute parity as normal.

For a degraded read I/O, the technique may read from surviving data storage devices to the virtual hot spare device.

For a write hit, the technique may write to the virtual hot spare device so that the background rebuilding process is not disturbed.

For a read hit, the technique may read from virtual hot spare device so that the background rebuilding process is not disturbed.

For a copy, the technique may read data from the failed device or else copy from surviving data storage devices to virtual hot spare device.

For a copy back, while replacement data storage device is being restored, user operations are targeted at virtual device.

This approach can have the advantage that the majority of I/O's are directed to the virtual hot spare device so as not to interfere with the rebuilding process of recreating the data of failed data storage device in the virtual hot spare device.

In a further embodiment, there is provided at least one physical hot spare device for use in conjunction with the technique as described herein in order to provide additional assurances. As described above, the technique may be configured to use either the physical hot spare device or to provision at least a portion of the cache as virtual hot spare device. The decision may be dependent on the location of the physical hot spare with respect to the data storage devices in the RAID configuration.

Figure 6A:
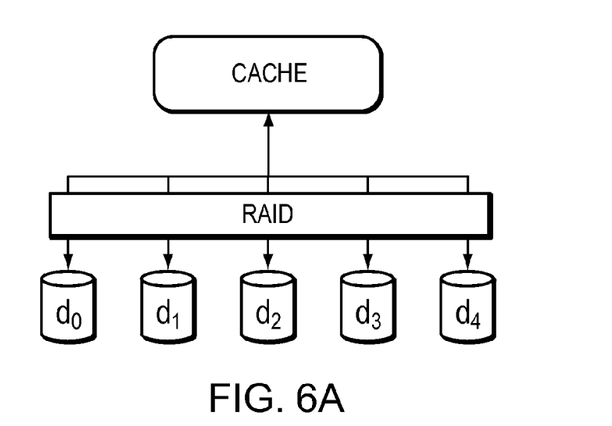
FIGS. 6(a) to (c) are diagrams illustrating the evolution from prior art conventional approaches to the technique as described herein.
Figure 6B:
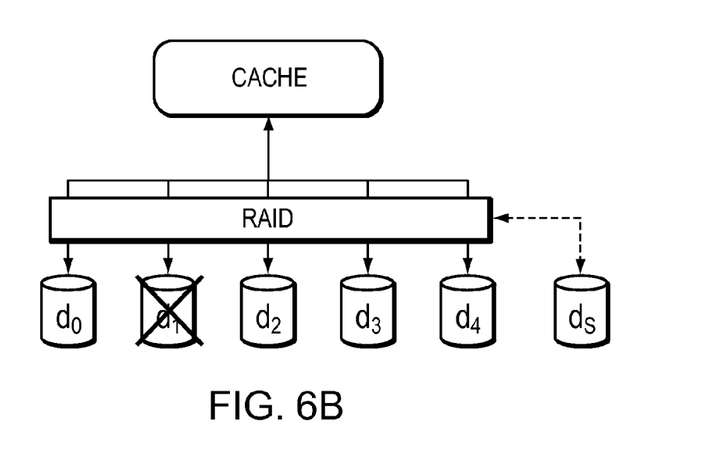
Figure 6C:
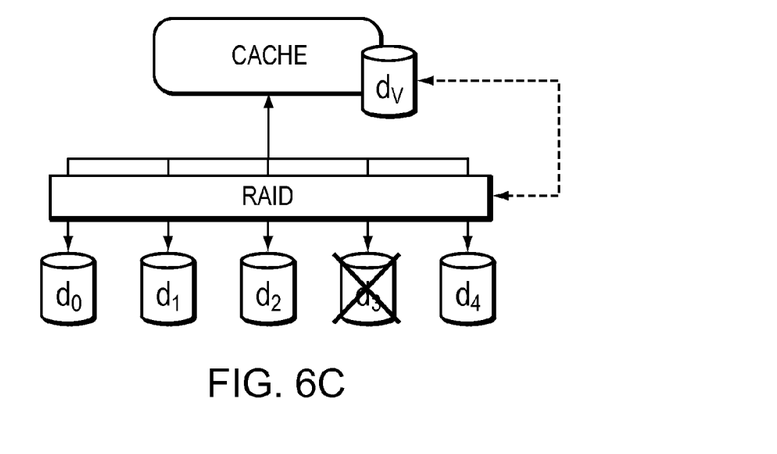

Referring to FIGS. 6(a) to (c), there is shown three figures illustrating the evolution from prior art conventional approaches to the technique as described herein. FIG. 6(a) illustrates a cache and five data storage devices (d0 to d4) arranged in a RAID configuration. There is no hot spare provided in this scenario. FIG. 6(b) illustrates a cache, five data storage devices (d0 to d4) arranged in a RAID configuration and a physical hot spare device ds. The figure illustrates a data storage device d1 in a failure state, and in such a scenario, the physical hot spare device ds is used and the data from d1 is copied thereto so that ds forms with the surviving four data storage devices (d0, d2, d3, d4) a RAID configuration. FIG. 6(c) illustrates a cache and five data storage devices (d0 to d4) arranged in a RAID configuration performing the technique as described herein. The figure illustrates d3 in a failure state. In this embodiment, the cache and data storage devices are configured so that at least a portion of the cache is provisioned as a virtual hot spare device dv in response to detecting the failure state. The virtual hot spare device dv can form with the surviving four data storage devices (d0, d1, d2, d4) a RAID configuration.

Figure 7:
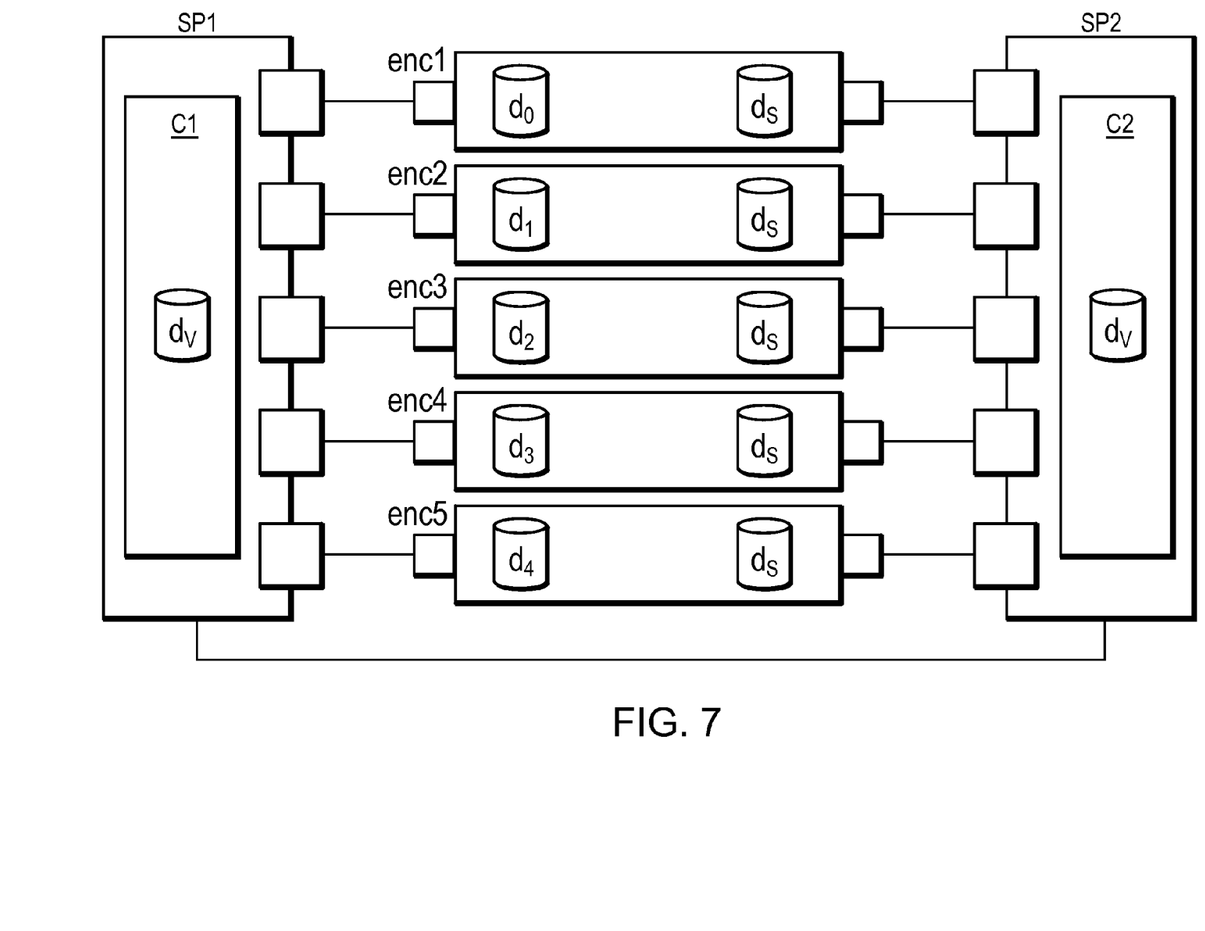
FIG. 7 is an example of an embodiment of a system that may utilize the techniques described herein.

Referring to FIG. 7, there is shown a block diagram illustrating a further example of a data storage system comprising first and second storage processors (SP1, SP2) comprising respective cache (C1, C2) communicating with data storage devices (d0 to d4). Additionally, the system comprises a cache mirroring bus configured to convey data between caches (C1, C2) of the storage processors (SP1, SP2) thus enabling cache mirroring between the storage processors (SP1, SP2). Mirroring the cache protects data in the event of a storage processor failure. The system is implementing the technique as described herein. In this embodiment, the data storage devices (d0 to d4) may be located in respective enclosures (enc1 to enc5). In another embodiment, the data storage devices may be arranged in a RAID configuration. Additionally, each enclosure (enc1 to enc5) may have a physical hot spare device (ds) located therein. It will be appreciated by those skilled in the art that each enclosure may also have discrete features, such as power sources and the like. In one embodiment, the technique as described herein may be configured for detecting the state of the data storage device as well as detecting the state of the features of the enclosure. The technique may also be configured for provisioning at least a portion of the cache as a virtual hot spare device in response to detecting a failure state in connection with a data storage device and/or features of the enclosure. In one embodiment, at least a portion of both cache (C1, C2) are provisioned as virtual hot spare devices by virtue of the cache mirroring bus. In view of the foregoing, it will be appreciated by those skilled in the art that the failure of one of the enclosures will not harm data storage in the remainder of the data storage system. The detection of a failure state in connection with one of the enclosures is limited to that particular enclosure and the problem is isolated from the other enclosures and data storage devices. Furthermore, it will also be appreciated by those skilled in the art that the reason for placing physical hot spare devices in each enclosure is to protect the system from the consequence of using a spare device from one enclosure to replace a failed data storage device in another enclosure and subsequently suffering from a failure of that enclosure which would defeat the RAID mechanism. Moreover, it will be appreciated by those skilled in the art that a virtual device in the cache would not be exposed to this failure mechanism, and is additionally protected against storage processor failure by the cache mirroring bus.

Figure 8:
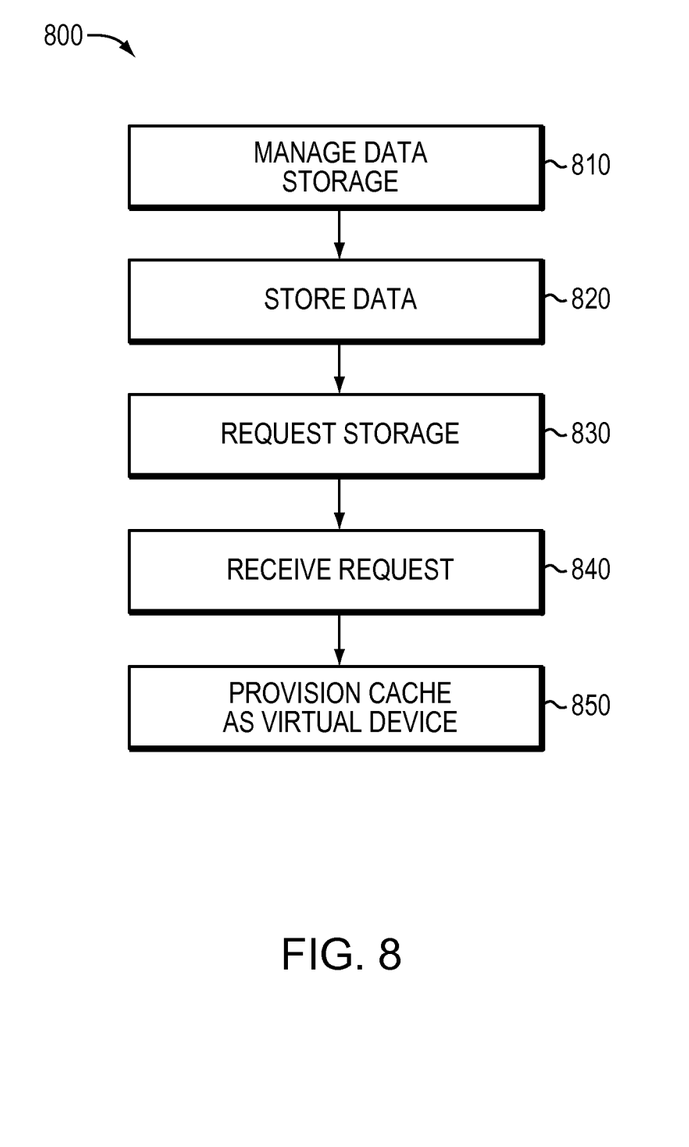
FIG. 8 is a flowchart summarizing the steps of a further embodiment for managing data storage.

Referring to FIG. 8, there is illustrated a flowchart summarizing the steps of a technique 800 for managing data storage. It will be appreciated that the aforementioned system and examples may be configured for performing the technique 800 summarized in the flowchart and described herein. The technique may also be performed by a computer program tool executable on a data storage system, for example, the data storage system 12 of FIG. 1. The technique comprises managing 810 data storage in a data storage system. The data storage system comprises a cache and a plurality of data storage devices. The technique also comprises storing 820 data on the data storage devices. Moreover, the technique comprises requesting 830 storage for data at least associated with data stored on at least one of the data storage devices. The request may be a request for temporary storage of data associated with data stored on at least one of the data storage devices. For example, the request may be for storage of write I/O temporarily before being synchronized with the data in the data storage device. Alternatively, the request may be for temporary storage of data stored in the data storage device before migrating the data to another data storage device. The technique comprises receiving 840 the request for storage for data at least associated with data stored on at least one of the data storage devices. Additionally, the technique comprises provisioning 850 at least a portion of the cache as a virtual device in response to receiving the request for storage for data at least associated with data stored on at least one of the data storage devices.

Figure 9:
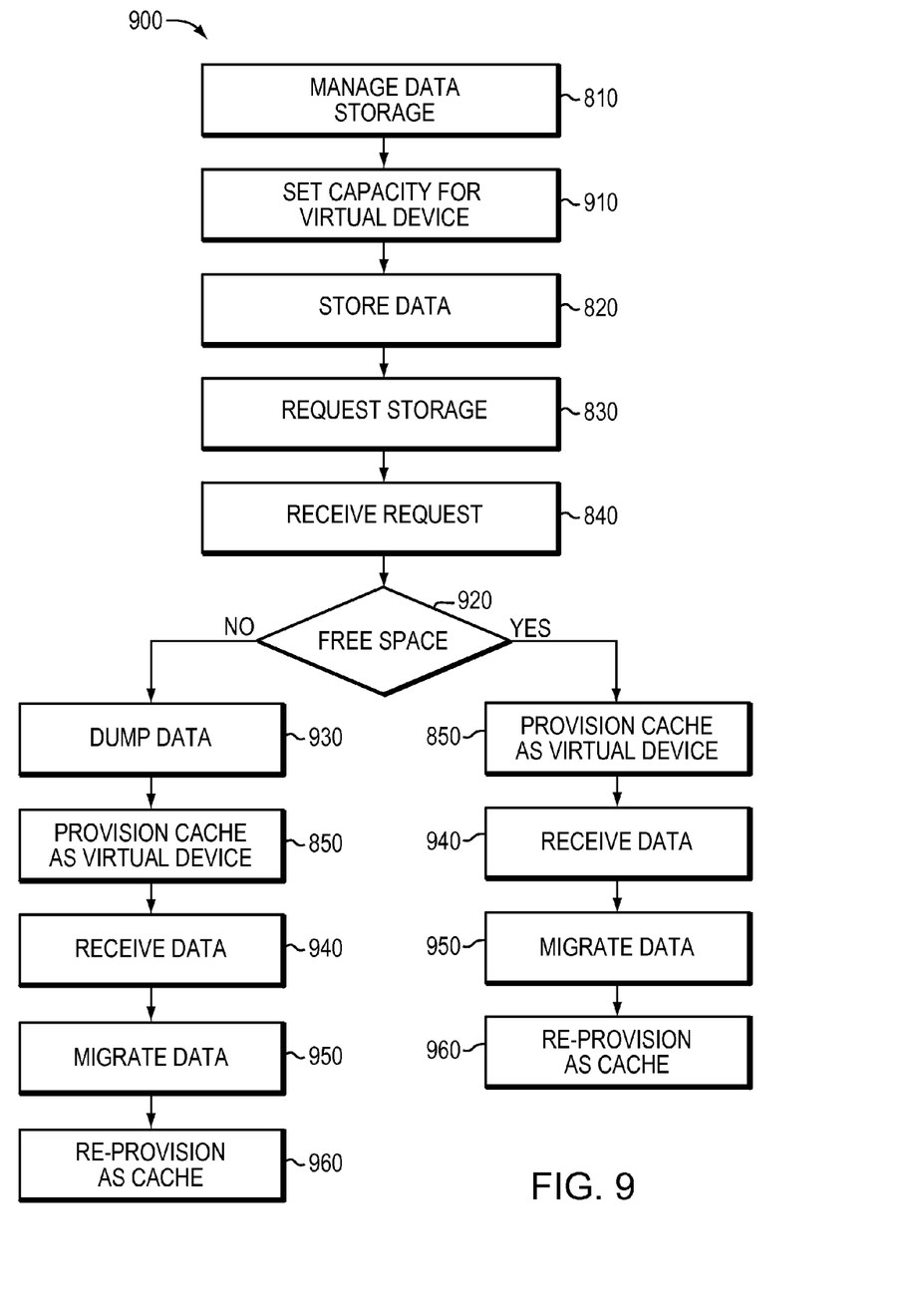
FIG. 9 is a flowchart summarizing the steps of a further embodiment for managing data storage.

Referring to FIG. 9, there is illustrated a flowchart summarizing the steps of a technique 900 for managing data storage. It will be appreciated that the aforementioned system and examples may be configured for performing the technique 900 summarized in the flowchart and described herein. The technique is substantially similar to that described with respect to FIG. 8 and similar steps will be identified by similar reference numerals and similar comments apply to similar steps as described herein. The technique may also be performed by a computer program tool executable on a data storage system, for example, the data storage system 12 of FIG. 1. The technique comprises managing 810 data storage in a data storage system comprising a cache and a plurality of data storage devices. The technique also comprises setting 910 a virtual device capacity value for a virtual device so that at least a portion of the cache may be provisioned as a virtual device with a capacity corresponding to the virtual device capacity value. In one embodiment, the virtual device capacity value may be set by a user of the data storage system. The technique also comprises storing 820 data on the data storage devices. Moreover, the technique comprises requesting 830 storage for data at least associated with data stored on at least one of the data storage devices. The request may be from a user of the data storage system. Alternatively, the data storage device itself may be configured to automatically make a request. The technique comprises receiving 840 the request for storage for data at least associated with data stored on at least one of the data storage devices. In another embodiment, the technique is further configured to determine whether the cache has free space 920 corresponding to the virtual device capacity value in response to receiving 840 the request. The determination 920 is necessary in order to ascertain if the cache can be provisioned as the virtual device with capacity corresponding to virtual device capacity value. For example, the cache may have data stored therein in which case action will need to be taken. In such a scenario the technique can be configured to dump 930 data such that the cache may have the necessary space or capacity to be provisioned as the virtual device. If the technique dumps 930 the data to create the free capacity corresponding to at least the virtual device capacity value, the cache can subsequently be provisioned 850 to act as the virtual device. If there is sufficient space the cache can be immediately provisioned 850 as the virtual device and there is no need to dump data. In this embodiment the technique receives 940 data associated with data stored on at least one of the data storage devices which in turn is associated with the request. For example, the data may be the data stored on a data storage device before migrating the data to another data storage device. In such a case, the data is moved from the data storage device to the virtual device. Alternatively, the data may be write I/O to be stored temporarily before being synchronized with the data in data storage device. The technique subsequently migrates 950 the data to data storage device after temporarily storing for a period of time. It may migrate the data to another data storage device or the actual same data storage device from which the request is associated in line with the above examples. The technique also comprises re-provisioning 960 the portion of the cache provisioned as the virtual device back to cache in response to migrating 950 the data to the data storage device as described above. In this way the capacity of the cache is always in use unless a storage configuration policy requires a free capacity requirement associated with the cache. The requirement for use of the virtual device can be an infrequent activity so the technique can provide the benefit of caching performance when virtual device not required.

It will be appreciated that the technique as described above may also be configured to check if the data in the cache has been synchronized with the data in the data storage devices. If it has not been synchronized the technique may be configured to ensure synchronization before dumping data. As will also be appreciated by those skilled in the art, the technique may also be configured to ensure that the data in the cache is synchronized with the data in the data storage devices periodically such that there is no need for a further synchronization operation when a request is received. In another embodiment, a storage administrator may form a storage configuration policy for the cache as described above.

The techniques as described above may have several different uses. For example, the techniques may be used in connection with migrating user data from one data storage array to another. This may be important in virtualized data centers, where hosts and applications are constantly moving around on different physical assets, and it becomes desirable to rebalance the data layout on storage arrays. Additionally, the techniques may be used in dealing with thin provisioning overflow, which presents to a user a large virtual container for their data, but only allocates what they are actually using at that moment, which is usually much less. In such a case, if a large number of users suddenly need all of their space some of those containers may be shifted to a different array. In these cases, the additional fast storage available through the virtual device could be used to stage the data for efficient transfer.

The techniques may also be used in storage tiering, such as in EMC FAST, enabling data to be moved between different tiers of storage representing varying performance and cost tradeoffs. However, if data is moved from tier A to tier B, the receiving tier has to have sufficient space available to accept the data before it too can attempt to move some of its data to a different tier. Having a temporary device that can provide this space can ease the problem of moving data, potentially making it more efficient by batching jobs together. It can also allow the tiers to run at higher levels of allocation than would otherwise be the case.

The techniques may also be used in some processes for advanced storage features such as compression and data de-duplication that do not run constantly but can require large amounts of memory. Virtual devices could help fulfill this need by providing temporary working data areas for these applications when needed.

The techniques can also be used for providing a virtual device for data storage devices and LUNs during maintenance. For example, a firmware upgrade may be performed on a data storage device. In such a scenario, the data storage system has to stop commands being sent to the device. It is difficult for a data storage system to compensate in such a scenario as it may consider this a failure of the device. By using the techniques as described herein the virtual device may receive and store all write I/Os in connection with the data storage device until the firmware is updated. The write I/Os in the virtual device may then be synchronized with the data in the data storage device and the virtual device re-provisioned as cache in response to the firmware having being updated. The read I/Os could be read from other storage devices using RAID functionality, for example. It is also possible to use the techniques during the performance of other maintenance functions such as running a diagnostic on the device.

Additionally, the data storage system may be configured to spin down a storage device when the device has not been accessed for a while so as to save power. When you start to talk to the device again it may take the device about a minute to come back to normal operations. The majority of systems may not be tolerant to such a delay. As will be appreciated by those skilled in the art, the techniques as described herein could also be used to store data in the virtual device until such time as the device is back to normal operations.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data storage, the method comprising:
providing a cache comprising first, second and third segments, the first segment for provisioning as a virtual hot spare device, the second segment for storing synchronized data, the third segment for storing unsynchronized data;
detecting the state of data storage devices in a RAID configuration;
in response to detecting a failure state in connection with at least one of the data storage devices in the RAID configuration, determining if the cache has free capacity to provision a virtual hot space device with a capacity corresponding to the failed data storage device; and
in response to determining the cache has the free capacity, provisioning at least a portion of the cache as a virtual hot spare device with a capacity corresponding to the failed data storage device.

2. The method as claimed in claim 1, further comprising:
rebuilding the data associated with the failed data storage device in the virtual hot spare device in response to provisioning at least a portion of the cache as the virtual hot spare device.

3. The method as claimed in claim 2, further comprising:
copying the rebuilt data in the virtual hot spare device to a repaired data storage device in response to repairing the failed data storage device; and
re-provisioning the virtual hot spare device as cache.

4. The method as claimed in claim 1, further comprising:
determining the location of a physical hot spare device;
verifying the location of the failed data storage device; and
based on the location of the failed data storage device and the location of the physical hot spare device, determining whether to use virtual hot spare device or the physical hot spare device.

5. The method as claimed in claim 1, further comprising:
dumping data from the cache so that at least a portion of the cache can be provisioned as the virtual hot spare device in response to determining that the cache does not have the free capacity.

6. The method as claimed in claim 1, further comprising:
protecting the failed data storage device from write I/O in response to detecting a failure state in connection with the data storage device.

7. A system for use in managing data storage, the system comprising:
first logic providing a cache comprising first, second and third segments, the first segment for provisioning as a virtual hot spare device, the second segment for storing synchronized data, the third segment for storing unsynchronized data;
second logic detecting the state of data storage devices in a RAID configuration;
in response to detecting a failure state in connection with at least one of the data storage devices in the RAID configuration, third logic determining if the cache has free capacity to provision a virtual hot space device with a capacity corresponding to the failed data storage device; and
in response to determining the cache has the free capacity, fourth logic provisioning at least a portion of the cache as a virtual hot spare device with a capacity corresponding to the failed data storage device.

8. The system as claimed in claim 7, further comprising:
fifth logic rebuilding the data associated with the failed data storage device in the virtual hot spare device in response to provisioning at least a portion of the cache as the virtual hot spare device.

9. The system as claimed in claim 8, further comprising:
sixth logic copying the rebuilt data in the virtual hot spare device to a repaired data storage device in response to repairing the failed data storage device; and
seventh logic re-provisioning the virtual hot spare device as cache.

10. The system as claimed in claim 7, further comprising:
eighth logic determining the location of a physical hot spare device;
ninth logic verifying the location of the failed data storage device; and
based on the location of the failed data storage device and the location of the physical hot spare device, tenth logic determining whether to use virtual hot spare device or the physical hot spare device.

11. The system as claimed in claim 7, further comprising:
eleventh logic dumping data from the cache so that at least a portion of the cache can be provisioned as the virtual hot spare device in response to determining that the cache does not have the free capacity.

12. The system as claimed in claim 7, further comprising:
twelfth logic protecting the failed data storage device from write I/O in response to detecting a failure state in connection with the data storage device.

* * * * *